April 4, 1967     F. F. FLOREK     3,312,196
AUTOMATIC ANIMAL FEEDER
Filed Sept. 7, 1965
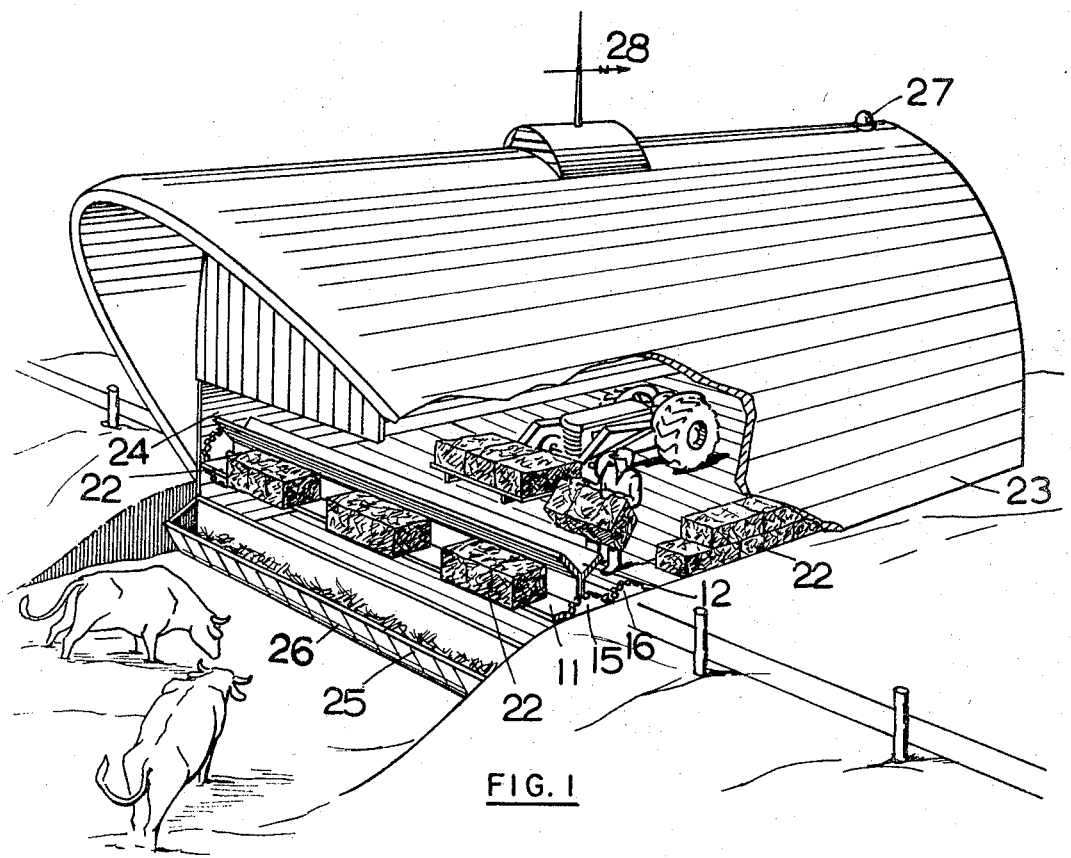
FIG. 1
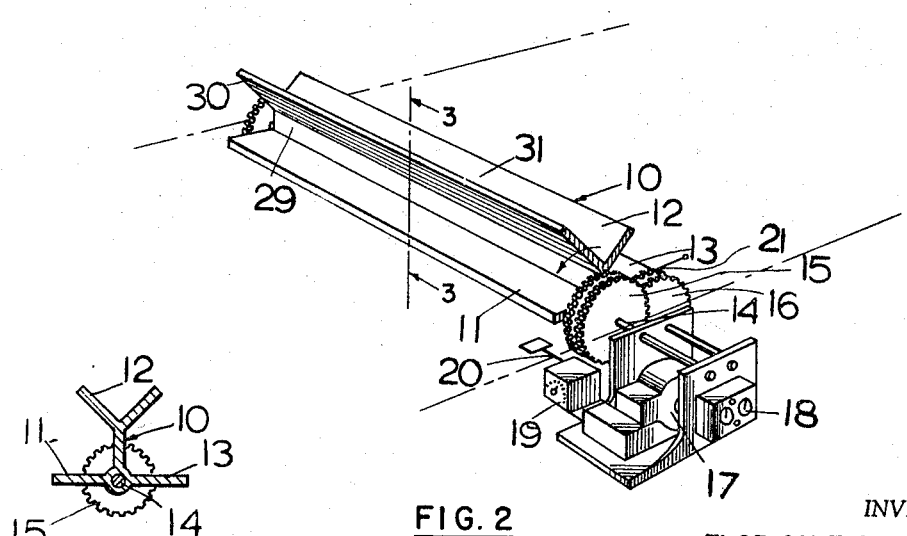
FIG. 2
FIG. 3
INVENTOR.
FLORIAN F. FLOREK M.D.
BY Charles L. Lovercheck
attorney United States Patent Office 3,312,196
Patented Apr. 4, 1967

3,312,196
AUTOMATIC ANIMAL FEEDER
Florian F. Florek, 27 Market St.,
Edinboro, Pa. 16412
Filed Sept. 7, 1965, Ser. No. 485,205
2 Claims. (Cl. 119—51.13)

This invention relates to feeders and, more particularly, to feeders particularly adapted for use in feeding baled hay, grain, cotton seed cake, and the like.

The present feeder constitutes an improvement over the automatic feeders for animals which are presently available.

The feeder disclosed herein can be used to dispense individual measures of grain, feed concentrate, cotton seed cake, or the like, either separately or in conjunction with bales of hay. The device may be operated by a timer, light signal, or radio signal, which could be emitted at the time the rack turns. The feeding may be set for any combination of feeding single bales of hay each cycle or several bales of hay each cycle, or any combination. The cycles may be one per day or more to suit the individual purpose; for example, the feeder could be set to provide for four days' feeding with one loading. That is, the owner can feed the cattle one day's feeding and load three days' feeding in the feeder.

The device may be loaded by means of a tractor with pallets or by a suitable conveyor system. The device could be loaded by means of a bulldozer or the like by pushing the bales of hay onto the rack.

It is, accordingly, an object of the present invention to provide an improved automatic feeder for animals.

Another object of the invention is to provide an automatic feeder which is simple in construction, economical to manufacture, and simple and efficient to use.

A further object of the invention is to provide an automatic feeder which will dispense predetermined amounts of feed at predetermined time intervals.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an isometric view of a feeder mounted in a barn according to the invention;

FIG. 2 is an enlarged isometric view of the feeder; and

FIG. 3 is a cross sectional view taken on line 3—3 of FIG. 2.

Now with more particular reference to the drawing, the automatic feeder indicated generally at 10 has a first flat surface 11 and a second flat surface 13 which are arranged in coplanar relation to each other. A V-shaped trough 12 has the apex of the V attached to the web 29 which is, in turn, attached to the flat surfaces between them. The V-shaped trough and web form a Y-shape in cross section. The specific construction details of this arrangement can be made according to the individual taste of the owner.

The rack which is made up of the trough 12 and the flat surfaces 11 and 13 is supported on a laterally extending shaft 14 which is carried in suitable bearings at each end of the feeder. The driven gears 15 are fixed to the shaft 14 and the driven gears are themselves driven by drive gears 16 which are likewise supported on the shaft and are driven by an electric motor 17 which is shown by way of an example. Gears 15 and 16 may be considered to be a reduction gear unit.

The timing mechanism 18 may be of a conventional type of timer or it could be a photocell type control or a radio control operated from a radio signal generated at some remote source; for example, from a transmitter indicated generally at 19. The radio transmitter which supplies the control signal could be located at any remote source and operated by a keying arrangement 20.

Baled hay indicated at 22 by way of example may be supported on the floor of the barn 23 as indicated. This hay may be stored on pallets which may be lifted by a tractor or the like as indicated. The barn will have an opening at the end as shown with the automatic feeder supported in this opening, the opening being generally indicated at 24.

A feed bin 25 is shown supported below the barn floor by way of example, to illustrate one embodiment of how the device could be installed. The barn shown might be any of the well known bank type barns or any other suitable barn having a floor above the level of the feeding lot ground.

In operation, the device would be loaded by rotating the rack counterclockwise until the outside surface of leg 30 of the V-shaped trough was parallel to the floor. Then, bales would be stacked between the web 29 and the surface 11. The rack would then be driven counterclockwise until the leg 31 of the V-shaped trough was generally parallel to the floor. Then, bales of hay would be loaded into the trough by a suitable loading arrangement, either a tractor, bulldozer, or other device. Then the device would be rotated until the surfaces 11 and 13 were generally horizontal. At this point, the surface 13 would have hay bales loaded on it. The owner would then place a first period's feeding of hay in the bin 25 so that the rack need not be rotated until the following period. Then, at the following period or after a predetermined time, the controls would be actuated by transmitter 19, by timing mechanism 18 or by some other suitable method. The motor 17 would thus be actuated and it would rotate the rack until the hay bales on surface 11 were dropped into the bin 25. Then, after a predetermined time determined by the timer 18 or after a signal was given by a radio control or the like, the rack would be again driven by the motor 17 until the feed in the trough 12 was dispensed into the bin 25. The same procedure would be repeated to dispense the feed resting on the surface 13. When the rack was thus unloaded, the operator would re-load the device and repeat the procedure during the next sequence of time periods.

As an alternative, the floor of the barn could be made of 2 x 6 timbers on edge, single or double, and spaced to accommodate a farm tractor. The bales could be stacked on the 2 x 6 timbers. The tractor could straddle the boards and slide the bales toward the loader, as a labor saving device.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a storage space for feed having
   a floor,
   a lot surface for animals,
   said floor being disposed above said lot surface,
   a feed bin supported below said floor,
   a feed dispenser extending substantially the length of
   one end of said floor above said bin, said dispenser comprising a rack having first and second generally flat surfaces disposed generally in the same plane and at the same level as said floor, a trough generally V-shaped in cross section disposed in spaced relation to said surfaces, said trough being of suitable size to receive bales of hay, means attaching the apex of said V to said rack between said generally flat surfaces, said rack being adapted to be disposed with said first flat surface generally perpendicular to said floor while feed is being loaded thereon, said flat surfaces being adapted to receive bales of hay, said rack having motor drive means adapted to rotate said rack to a position where said two generally flat surfaces are generally parallel to said floor while feed is loaded in said trough and on said second flat surface, intermittent timer control means connected to said motor whereby said drive means is adapted to rotate said dispenser to a position to allow said feed on said first generally flat surface to fall into said bin, then to rotate said dispenser to allow said feed in said trough to fall into said bin, and then to rotate said dispenser to allow said feed from said second generally flat surface to fall into said bin.

2. The combination recited in claim 1 wherein said control means further includes a radio actuated control for said motor.

References Cited by the Examiner
UNITED STATES PATENTS

| | | | |
|---|---|---|---|
| 911,674 | 2/1909 | Olsen | 119—51.13 |
| 2,565,801 | 8/1951 | Byers | 119—56 |
| 3,180,321 | 4/1965 | Aldinger | 119—51 |
| 3,199,731 | 8/1965 | Braver | 119—51.11 X |

SAMUEL KOREN, *Primary Examiner.*

HUGH R. CHAMBLEE, *Examiner.*